United States Patent [19]
Yasuzumi

[11] Patent Number: 5,549,368
[45] Date of Patent: Aug. 27, 1996

[54] ABS MAIN MICROPROCESSOR MALFUNCTION DETERMINATON BASED ON PRESSURE REDUCTION OR HOLDING PERIODS

[75] Inventor: Kazumi Yasuzumi, Itami, Japan

[73] Assignee: Sumitomo Electric Industries, Ltd., Osaka, Japan

[21] Appl. No.: 431,286

[22] Filed: Apr. 28, 1995

[30] Foreign Application Priority Data

Jul. 21, 1994 [JP] Japan ................................ 6-169316

[51] Int. Cl.$^6$ ........................................................ B60T 8/88
[52] U.S. Cl. ................................................. 303/122.08
[58] Field of Search ................... 303/122.02, 122.04, 303/122.05, 122.06, 122.07, 122.08, 154, 176

[56] References Cited

U.S. PATENT DOCUMENTS 4,700,304  10/1987  Byrne et al. .................. 303/122.05 X

FOREIGN PATENT DOCUMENTS 471951    2/1992   European Pat. Off. ........... 303/122.05

| | | |
|---|---|---|
| 59-130768 | 7/1984 | Japan . |
| 63-233401 | 9/1988 | Japan . |
| 64-47656 | 2/1989 | Japan . |
| 2296570 | 12/1990 | Japan . |
| 3-7538 | 2/1991 | Japan . |

*Primary Examiner*—Josie Ballato
*Attorney, Agent, or Firm*—Greenblum & Bernstein, P.L.C.

[57] ABSTRACT

An antilock brake control device comprising: a main microprocessor which forms a judgment on antilock control on the basis of wheel speed signals inputted from wheel speed sensors so as to output control signals to an actuator of a brake fluid pressure circuit in accordance with the judgment; a drive circuit for outputting drive signals to the actuator in response to the control signals; and a monitor for monitoring the control signals of the main microprocessor; wherein when a state in which the main microprocessor outputs to the actuator at least once during a first predetermined period the control signals for commanding pressure reduction or pressure holding has lasted continuously for not less than a second predetermined period, the monitor outputs, by judging that the main microprocessor does not function properly, a control prohibition signal for prohibiting operation of the drive circuit.

22 Claims, 6 Drawing Sheets

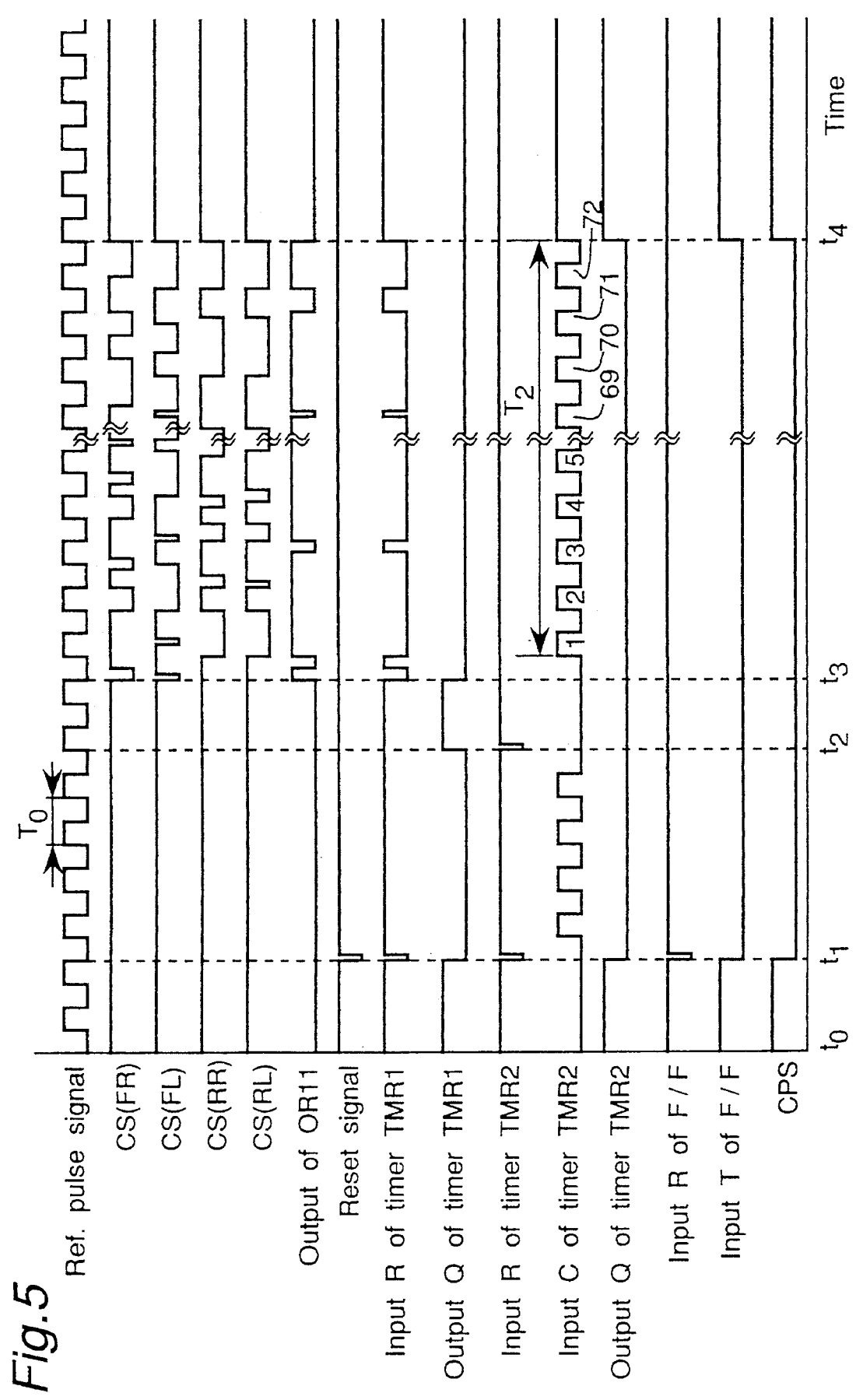

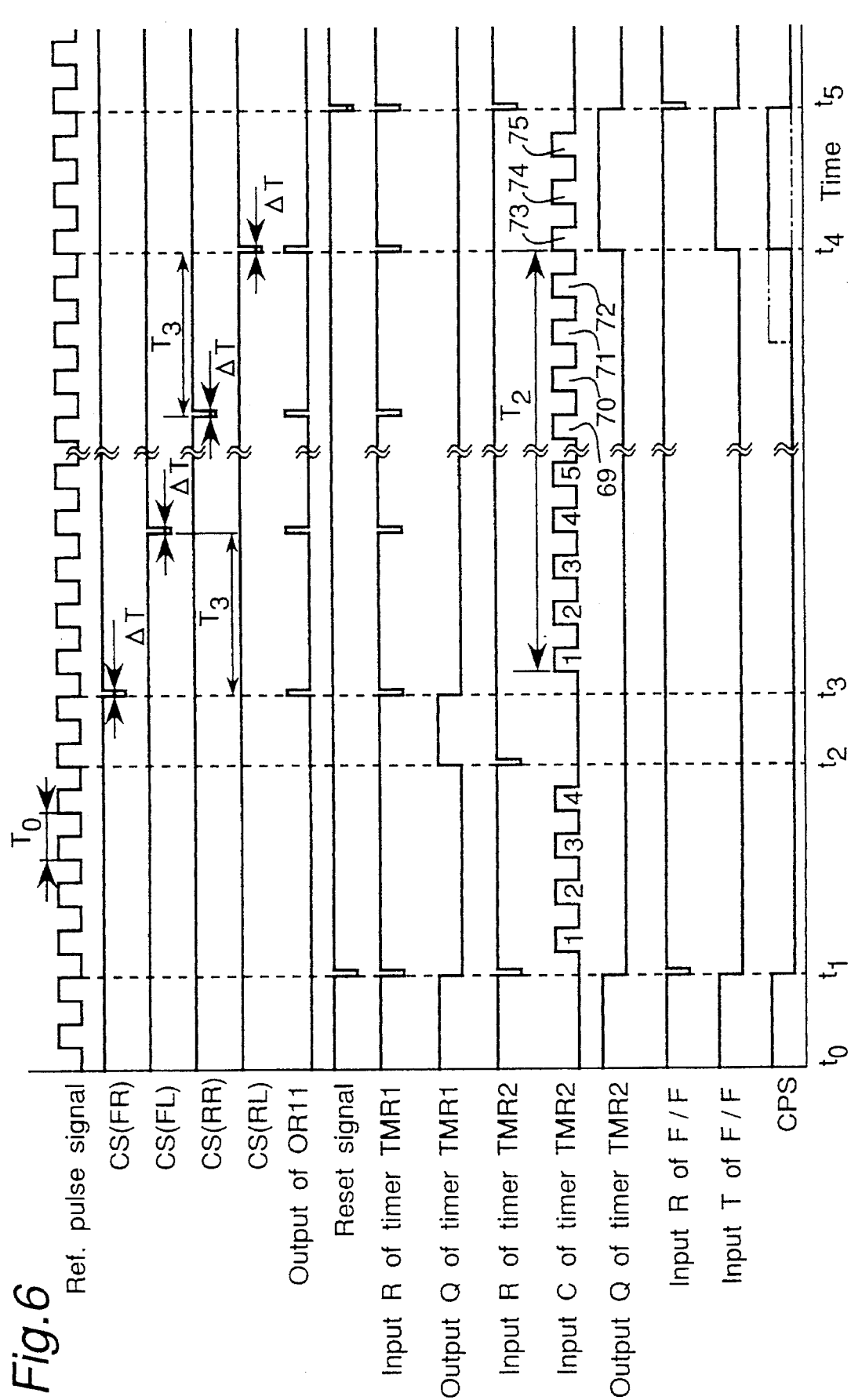

ABS MAIN MICROPROCESSOR MALFUNCTION DETERMINATON BASED ON PRESSURE REDUCTION OR HOLDING PERIODS

BACKGROUND OF THE INVENTION

The present invention generally relates to antilock brake control devices and more particularly, to an antilock brake Control device including a microprocessor which detects locking symptom of wheels on the basis of signals inputted from wheel speed sensors so as to output control signals to actuators and a monitor which prohibits antilock control when the monitor has detected that the microprocessor is not functioning properly.

Generally, in a known antilock-brake control device for a motor vehicle, arithmetic operation of signals outputted by wheel speed sensors is performed by a microprocessor such that locking symptom of wheels is monitored from such behaviors of the wheels and a vehicle as wheel speeds, wheel accelerations or decelerations, an estimated vehicle speed, etc. Meanwhile, when locking symptom of the wheels has been detected, the microprocessor outputs to actuators signals for commanding reduction of brake fluid pressure. Then, in case the wheel speeds trend towards recovery, the microprocessor outputs to the actuators signals for commanding increase of brake fluid pressure. By adjusting brake fluid pressure as described above, skid of the wheels is restricted to a region in the vicinity of peak of coefficient of friction of a road surface on which the motor vehicle is running, so that not only braking distance is shortened but stability of the vehicle body and driving performance are improved.

Regardless of whether or not a driver brakes the wheels, the known antilock brake control device is operated to reduce brake fluid pressure. Therefore, if false control signals are outputted to the actuators by the microprocessor due to malfunction of the microprocessor, such serious problem arise that behaviors of the vehicle body become unstable, etc. In order to solve this problem, an antilock brake control device has been hitherto provided in which in case malfunction of the microprocessor has been detected by monitoring the microprocessor, antilock control is prohibited.

Firstly, such an antilock brake control device including two independent microprocessors receiving signals from wheel speed sensors, respectively is disclosed in, for example, Japanese Patent Laid-Open Publication No. 59-130768 (1984). In this prior art antilock brake control device, control signals of one microprocessor are not only outputted to actuators but compared with control signals outputted from the other microprocessor. In case the control signals of one microprocessor do not coincide with those of the other microprocessor, antilock control is prohibited by judging that the microprocessor are not functioning properly. In the prior art antilock brake control device of this kind, since the two microprocessors perform same arithmetic operations, an identical microprocessor is used for the two microprocessors.

Secondly, Japanese Patent Publication No. 3-7538 (1991) or Japanese Patent Laid-Open Publication No. 63-233401 (1988) discloses an antilock brake control device including two independent microprocessors for controlling actuators of different brake fluid pressure circuits, respectively such that each of the microprocessors monitors control outputs of the remaining one of the microprocessors. Also in this known antilock brake control device, since the two microprocessors perform same arithmetic operations, an identical microprocessor is used for the microprocessors.

Thirdly, Japanese Patent Laid-Open Publication No. 2-296570 (1990) discloses an antilock brake control device including a main microprocessor which performs arithmetic operation of signals of wheel speed sensors so as to output control signals and a fail-safe microprocessor for monitoring the main microprocessor. The fail-safe microprocessor includes a timer for measuring period during which the control signals command pressure reduction. If the period measured by the timer exceeds a predetermined period (ON limit period), the fail-safe microprocessor prohibits operation of the main microprocessor by judging that the main microprocessor is not functioning properly. Meanwhile, in this conventional antilock brake control device, when pressure reduction is necessary for the ON limit period or more as in the case of high-speed running, the timer is adapted to be reset by momentarily changing control signals to pressure increase at a preset interval shorter than the ON limit period. Since the preset interval for changing the control signals to pressure increase is extremely short, actuators are not operated, thereby resulting in exertion of no influence on control of brake fluid pressure.

Fourthly, Japanese Patent-Laid Open Publication No. 64-47656 (1989) filed by the assignee assigned by the present assignee discloses an antilock brake control device in which a microprocessor detects its own malfunction.

However, the prior art antilock brake control devices referred to above have the following drawbacks. Initially, in the first and second prior art antilock brake control devices, since the two microprocessors of the same kind are used, malfunction of the microprocessor may not be detected in the case of systematic error exerting an identical influence on the two microprocessors, e.g., interference of radio frequency, variations in a power source, etc. Meanwhile, the two microprocessor capable of performing arithmetic operation of the signals of the wheel speed sensors are required to be provided in the antilock brake control devices of this kind, thus resulting in rise of production cost of the antilock brake control devices.

Meanwhile, in the third prior art antilock brake control device, since the fail-safe microprocessor which merely monitors the main microprocessor may be of relatively simpler structure than that of the main microprocessor, systematic error can be dealt with and production cost of the antilock brake control device can lowered.

However, in the third prior art antilock brake control device, since the fail-safe microprocessor detects malfunction of the main microprocessor when period during which the main microprocessor outputs pressure reduction exceeds the ON limit period, a problem arises when detection of malfunction (initial check) of the antilock brake control device is performed upon turning on of a power source of a motor vehicle at the time of start of the motor vehicle. Namely, the fail-safe microprocessor detects that the main microprocessor has outputted the control signals of pressure reduction for not less than the ON limit period. Thus, in order to confirm that the fail-safe microprocessor functions properly at the time of initial check, it is necessary to cause the main microprocessor to output the control signals of pressure reduction for a predetermined duration not less than at least the ON limit period. Therefore, during this predetermined duration, braking force cannot be obtained even if the driver steps on a brake pedal. As a result, assuming that the motor vehicle is parked on a slope at the time of initial check, the motor vehicle may run downwardly due to lack of braking force. Likewise, also during running of the motor vehicle, it is impossible to confirm that the fail-safe microprocessor is functioning properly.

Furthermore, in the case where the microprocessor detects its own malfunction as in the fourth prior art antilock brake control device, there is a high possibility that malfunction of the microprocessor cannot be detected in comparison with the first to third prior art antilock brake control devices employing the two microprocessors.

SUMMARY OF THE INVENTION

Accordingly, an essential object of the present invention is to provide, with a view to eliminating the above mentioned inconveniences of conventional antilock brake control devices, an antilock brake control device in which malfunction of a microprocessor can be detected positively even in the case of systematic error and initial check can be performed safely and positively.

In order to accomplish this object of the present invention, an antilock brake control device embodying the present invention comprises: a main microprocessor which forms a judgment on antilock control on the basis of a wheel speed signal inputted from wheel speed sensor so as to output a control signal to an actuator of a brake fluid pressure circuit in accordance with the judgment; a drive circuit for outputting a drive signal to the actuator in response to the control signal; and a monitor for monitoring the control signal of the main microprocessor; wherein when a state in which the main microprocessor outputs to the actuator at least once during a first predetermined period the control signal for commanding pressure reduction or pressure holding has lasted continuously for not less than a second predetermined period, the monitor outputs, by judging that the main microprocessor does not function properly, a control prohibition signal for prohibiting operation of the drive circuit.

In the antilock brake control device of the present invention, when a state in which the main microprocessor outputs to the actuator at least once during the first predetermined period the control signal for commanding pressure reduction or pressure holding has lasted continuously for not less than the second predetermined period, the control prohibition signal for prohibiting operation of the drive circuit is outputted by judging that the main microprocessor does not function properly. Therefore, antilock control can be prohibited by positively detecting malfunction of the main microprocessor.

BRIEF DESCRIPTION OF THE DRAWINGS

This object and features of the present invention will become apparent from the following description taken in conjunction with the preferred embodiment thereof with reference to the accompanying drawings, in which:

FIGS. 4, 5 and 6 are timing charts explanatory of operation of the antilock brake control device of FIG. 1.

Before the description of the present invention proceeds, it is to be noted that like parts are designated by like reference numerals throughout several views of the accompanying drawings.

DETAILED DESCRIPTION OF THE INVENTION

Figure 1:
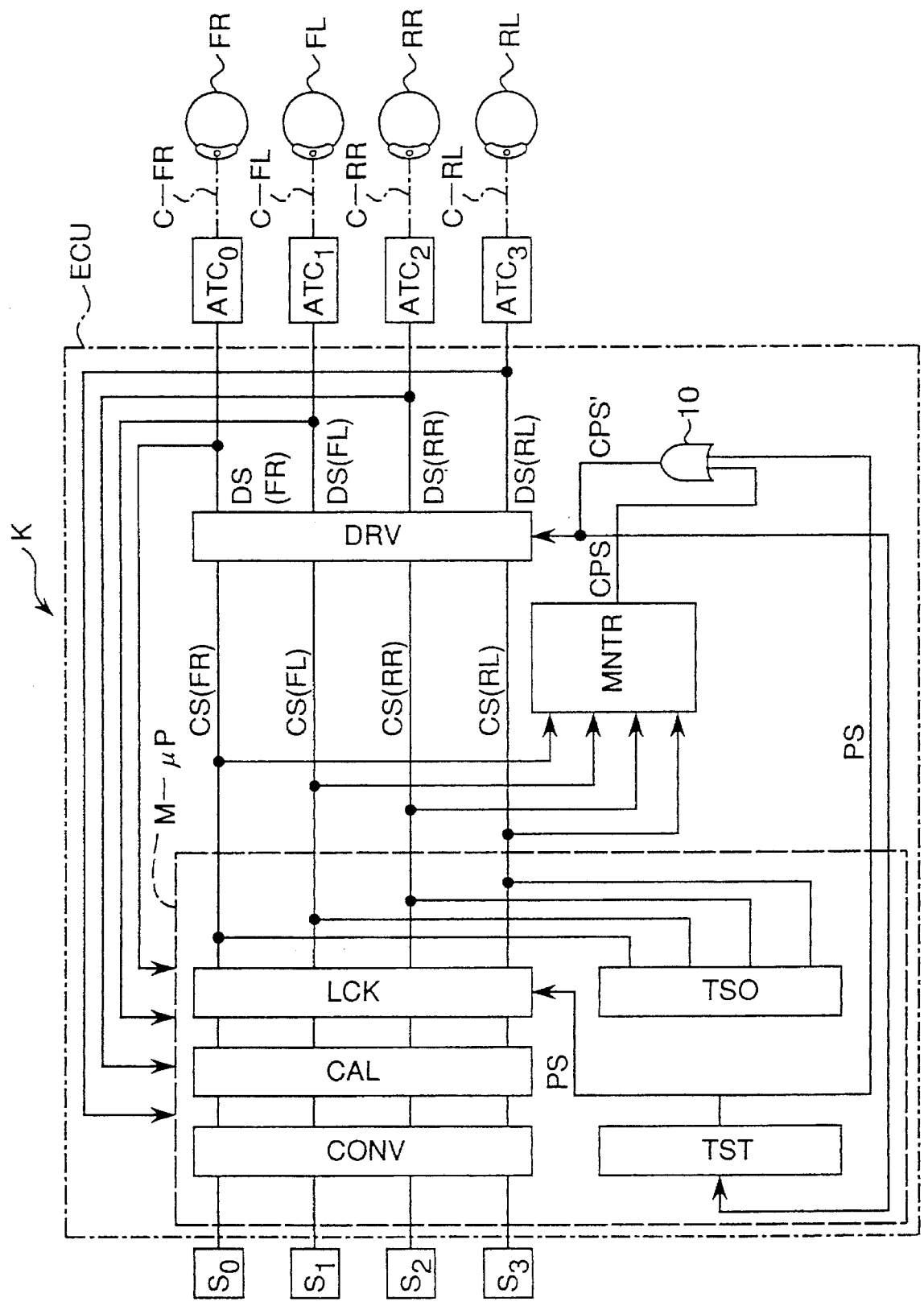
FIG. 1 is a schematic view of an electronic control unit of an antilock brake control device according to the present invention.
Figure 2:
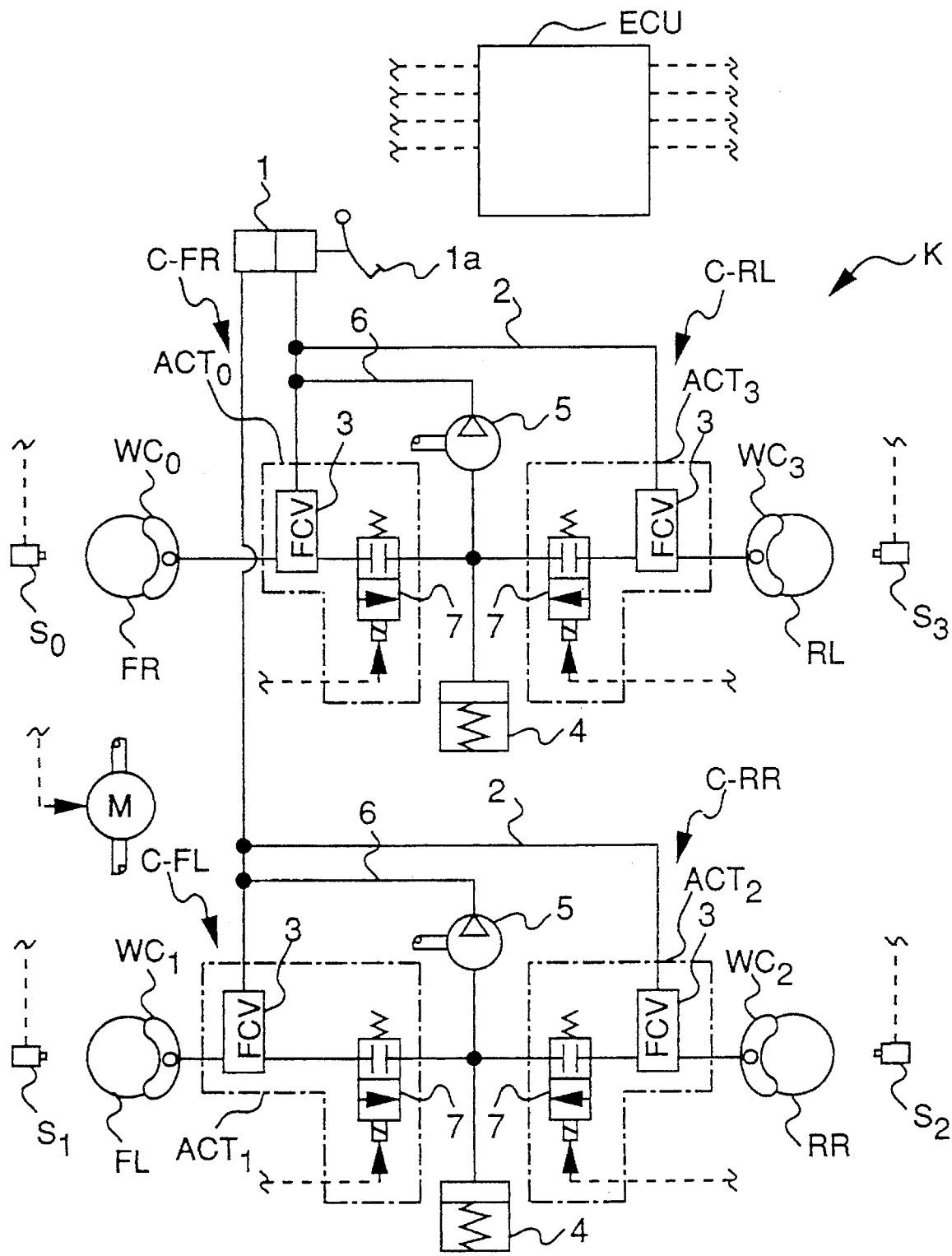
FIG. 2 is a schematic view of the antilock brake control device of FIG. 1.

Referring now to the drawings, there is shown in FIGS. 1 and 2, an antilock brake control device K according to one embodiment of the present invention. The antilock brake control device K is of four-channel type including four brake fluid pressure circuits C-FR, C-FL, C-RR and C-RL having actuators $ACT_0$, $ACT_1$, $ACT_2$ and $ACT_3$ for a front right wheel FR, a front left wheel FL, a rear right wheel RR and a rear left wheel RL, respectively. Wheel speed sensors $S_0$, $S_1$, $S_2$ and $S_3$ are provided for detecting speeds of the front right wheel FR, the front left wheel FL, the rear right wheel RR and the rear left wheel RL, respectively. The wheel speed sensors $S_0$ to $S_3$ are of known constructing in which rotation of a gear (not shown) mounted on a rotary shaft of each of the wheels FR to RL is detected, as an AC signal, by a pickup and this AC signal (wheel speed signal) is outputted to an electronic control unit (ECU).

The electronic control unit ECU includes a main microprocessor M-μP, a drive circuit DRV and a monitor MNTR and performs a predetermined arithmetic operation of the wheel speed signals outputted by the wheel speed sensors $S_0$ to $S_3$ so as to output to the actuators $ACT_0$ to $ACT_3$ of the brake fluid pressure circuits C-FR to C-RL, drive signals DS(FR), DS(FL), DS(RR) and DS(RL) for commanding pressure reduction or pressure increase, respectively. Meanwhile, the drive signals DS(FR) to DS(RL) outputted by the drive circuit DRV are inputted to the main microprocessor M-μP such that the main microprocessor M-μP monitors its own operation on the basis of these drive signals DS(FR) to DS(RL).

As shown in FIG. 2, each of the actuators $ACT_0$ to $ACT_3$ provided in the brake fluid pressure circuits C-FR to C-RL, respectively includes an inlet valve 3 provided in a supply passage 2 connecting a master cylinder 1 and wheel cylinders $WC_0$, $WC_1$, $WC_2$ and $WC_3$ for the wheels FR, FL, RR and RL, respectively and a return passage 6 returning from each of the wheel cylinders $WC_0$ to $WC_3$ towards the master cylinder 1 through an outlet valve 7, a reservoir 4 and a pump 5. The inlet valve 3 is a flow control valve of known construction, while the outlet valve 7 is a normally closed on-off type solenoid valve.

When the drive signals DS(FR) to DS(RL) of low level are, respectively, inputted from the drive circuit DRV to the actuators $ACT_0$ to $ACT_3$, a solenoid of the outlet valve 7 is set to ON state, so that the outlet valve 7 is opened. Thus, even in a state in which a brake pedal 1a has been stepped on, brake fluid pressure of the wheel cylinders $WC_0$ to $WC_3$ is reduced. On the contrary, when the drive signals DS(FR) to DS(RL) of high level are, respectively, inputted to the actuators $ACT_0$ to $ACT_3$, the solenoid of the outlet valve 7 is set to OFF state, so that the outlet valve 7 is closed and thus, brake fluid pressure of the wheel cylinders $WC_0$ to $WC_3$ is raised in accordance with stepping stroke of the brake pedal 1a.

The main microprocessor M-μP includes a converter CONV, a calculator CAL for calculating behaviors of the wheels and a vehicle, an antilock decision portion LCK, a testing signal output portion TSO and a testing portion TST. The converter CONV converts into digital signals, the wheel speed signals of the wheels FR to RL inputted from the wheel speed sensors $S_0$ to $S_3$ so as to output the digital signals to the calculator CAL. The calculator CAL calculates wheel speeds, wheel accelerations or decelerations, an estimated value of a vehicle speed (estimated vehicle speed), etc. on the basis of the wheel speed signals converted into the digital signals by the converter CONV and outputs these speeds to the antilock decision portion LCK. On the basis of the wheel speeds, the wheel accelerations or decelerations, the estimated vehicle speed, etc., the antilock decision portion LCK judges whether or not each of the wheels FR, FL, RR and RL has locking symptom. Various methods for judging locking symptom of the wheels are known. For example, in one method, when a difference between the wheel speed of one of the wheels FR to RL and the estimated vehicle speed exceeds a first predetermined threshold value and the wheel acceleration or deceleration of the one of the wheels FR to RL exceeds a second predetermined threshold value, it is judged that the one of the wheels FR to RL has locking symptom, while otherwise, it is judged that the one of the wheels FR to RL trends towards recovery from locking symptom.

When the antilock decision portion LCK has detected that one of the wheels FR, FL, RR and RL has locking symptom, the antilock decision portion LCK outputs a corresponding one of control signals CS(FR), CS(FL), CS(RR) and CS(RL) of low level to the drive circuit DRV so as to give a command of pressure reduction to a corresponding one of the actuators $ACT_0$ to $ACT_3$ of the brake fluid pressure circuits C-FR to C-RL. On the other hand, when the antilock decision portion LCK has judged that one of the wheels FR to RL trends towards recovery from locking symptom through recovery of the wheel speed, the antilock decision portion LCK outputs a corresponding one of the control signals CS(FR) to CS(RL) of high level to the drive circuit DRV so as to give a command of pressure increase to a corresponding one of the actuators $ACT_0$ to $ACT_3$.

The control signals CS(FR) to CS(RL) are inputted to the drive circuit DRV from the main microprocessor M-µP as described above. While the control signals CS(FR) to CS(RL) are of high level for pressure increase, the drive circuit DRV outputs the drive signals DS(FR) to DS(RL) of high level to the actuators $ACT_0$ to $ACT_3$. On the contrary, while the control signals CS(FR) to CS(RL) are of low level for pressure reduction, the drive circuit DRV outputs the drive signals DS(FR) to DS(RL) of low level to the actuators $ACT_0$ to $ACT_3$.

The testing signal output portion TSO and the testing portion TST perform initial check of the monitor MNTR. At the time of initial check of the monitor MNTR, the testing signal output portion TSO outputs the control signals CS(FR) to CS(RL) to the drive circuit DRV and the monitor MNTR irrespective of decision of the antilock decision portion LCK. At the time of initial check, a control prohibition signal CPS outputted by the monitor MNTR as will be described later is inputted to the testing portion TST so as to be monitored by the testing portion TST. In case the testing portion TST has judged that the monitor MNTR does not function properly, the testing portion TST outputs an operational prohibition signal PS of high level to the antilock decision portion LCK and an OR circuit 10.

The control signals CS(FR), CS(FL), CS(RR) and CS(RL) outputted by the antilock decision portion LCK are inputted to the monitor MNTR such that the monitor MNTR monitors from the control signals CS(FR) to CS(RL) whether or not the main microprocessor M-µP functions properly. Meanwhile, when the monitor MNTR has judged that the main microprocessor M-µP functions properly, the monitor MNTR outputs to the drive circuit DRV the control prohibition signal CPS of low level indicative of permission of control. On the other hand, when the monitor MNTR has judged that the main microprocessor M-µP does not function properly, the monitor MNTR outputs to the drive circuit DRV the control prohibition signal CPS of high level indicative of prohibition of control. The control prohibition signal CPS is inputted to the OR circuit 10 and a control prohibition signal CPS' outputted by the OR circuit 10 is inputted to the drive circuit DRV and the testing portion TST.

Figure 3:
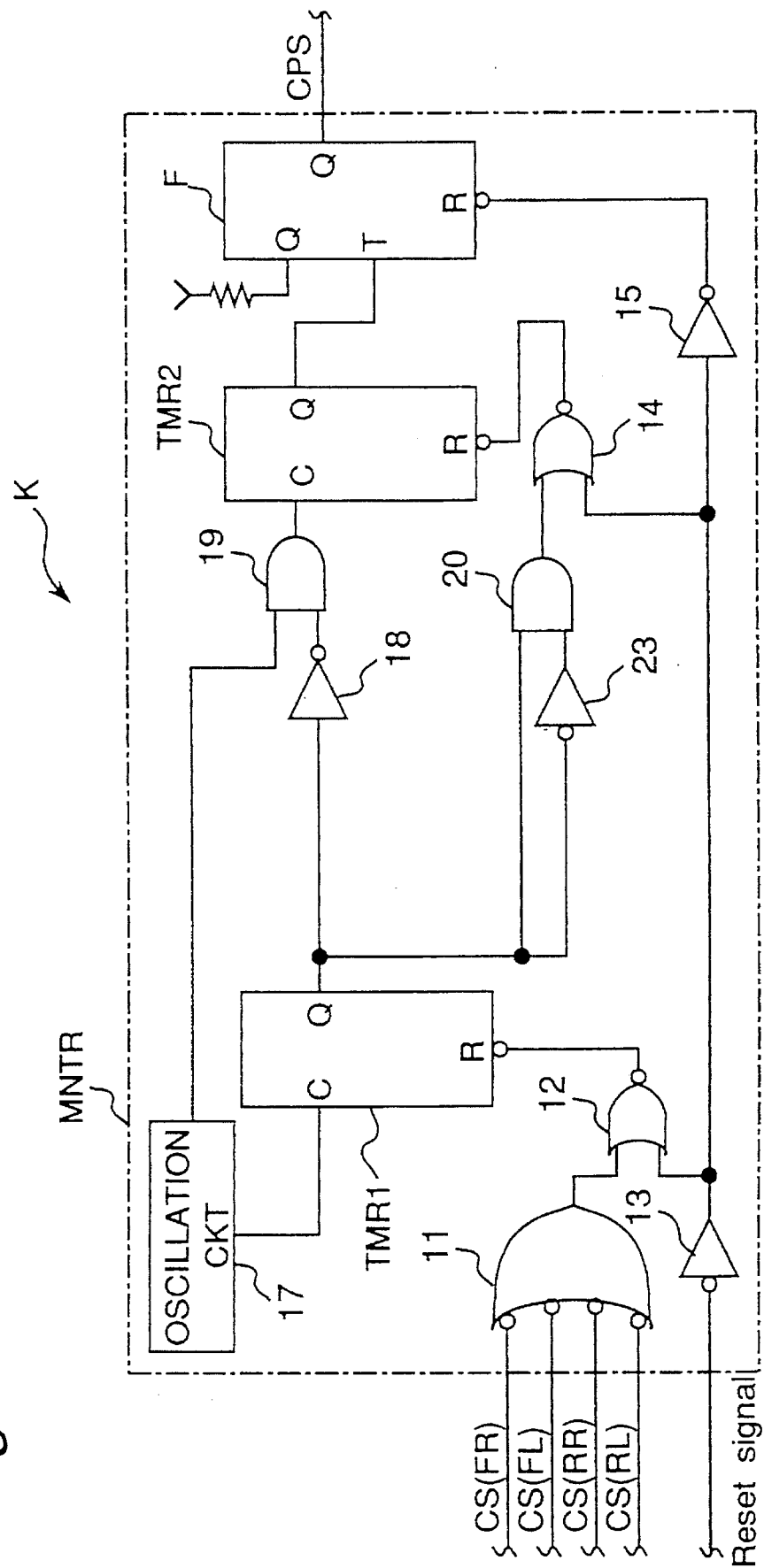
FIG. 3 is a circuit diagram of the antilock brake control device of FIG. 1.

In this embodiment, the monitor MNTR is formed by an electronic circuit constituted by semiconductor elements such as transistors as shown in FIG. 3. As shown in FIG. 3, the monitor MNTR includes a first timer TMR1 for measuring a first predetermined period, a second timer TMR2 for measuring a second predetermined period and a flip-flop circuit F. The control signals CS(FR) to CS(RL) are inputted to an OR circuit 11. When at least one of the control signals CS(FR) to CS(RL) is of low level, the OR circuit 11 outputs a signal of high level to an OR circuit 12. Meanwhile, a reset signal to be reset in the case of low level is inputted to the OR circuit 12 via an inverter 13. When one of outputs of the OR circuit 11 and the inverter 13 is of high level, the OR circuit 12 outputs a signal of low level to a reset input R of the first timer TMR1. Meanwhile, the signal outputted by the inverter 13 is inputted not only to one input of an OR circuit 14 but to a reset input R of the flip-flop circuit F through an inverter 15.

A reference pulse signal having a period $T_0$ is inputted to a clock input C of the first timer TMR1 from an oscillation circuit 17. When a pulse signal of low level is inputted to the reset input R of the first timer TMR1, the first timer TMR1 measures a first predetermined period $T_1$ by counting the reference pulse signal and outputs a signal of low level from an output Q during the first predetermined period $T_1$. The first predetermined period $T_1$ depends on method of antilock control and characteristics of the inlet valve 3 and the outlet valve 7 of the actuators $ACT_0$ to $ACT_3$ but is usually set at 1 to 2 sec. approximately. In this embodiment, the first predetermined period $T_1$ is set at $4 \times T_0$, i.e., $T_1 = 4 \times T_0$.

The signal outputted from the first timer TMR1 is inputted to an AND circuit 19 through an inverter 18. The reference pulse signal is also inputted to the AND circuit 19 from the oscillation circuit 17. Furthermore, a signal outputted by the AND circuit 19 is inputted to a clock input C of the second timer TMR2. Meanwhile, the signal outputted from the first timer TMR1 is directly inputted to one input of an AND circuit 20 and is inputted to the other input of the AND circuit 20 through an inverter 23. A signal outputted from the AND circuit 20 is inputted to the other input of the OR circuit 14 and a signal outputted from the OR circuit 14 is inputted to a reset input R of the second timer TMR2.

Only when the signal outputted from the first timer TMR1 is of low level, the reference pulse signal is inputted to the clock input C of the second timer TMR2. The second timer TMR2 measures a second predetermined period $T_2$ by counting the reference pulse signal and outputs a signal of high level from an output Q upon lapse of the second predetermined period $T_2$. In this embodiment, the second predetermined period $T_2$ is 18 times the first predetermined period $T_1$, i.e., $T_2 = 72 \times T_0$. The second predetermined period $T_2$ is set at a value exceeding period of antilock control possible during proper operation of the main microprocessor M-µP, for example, not less than 30 sec.

A signal is inputted to a trigger input T of the flip-flop circuit F from the output Q of the second timer TMR2. When this signal changes from low level to high level, the control prohibition signal CPS of high level is outputted from an output Q of the flip-flop circuit F.

In this embodiment, since the monitor MNTR is formed by the electronic circuit as described above, production cost of the antilock brake control device K as a whole can be lowered.

Figure 4:
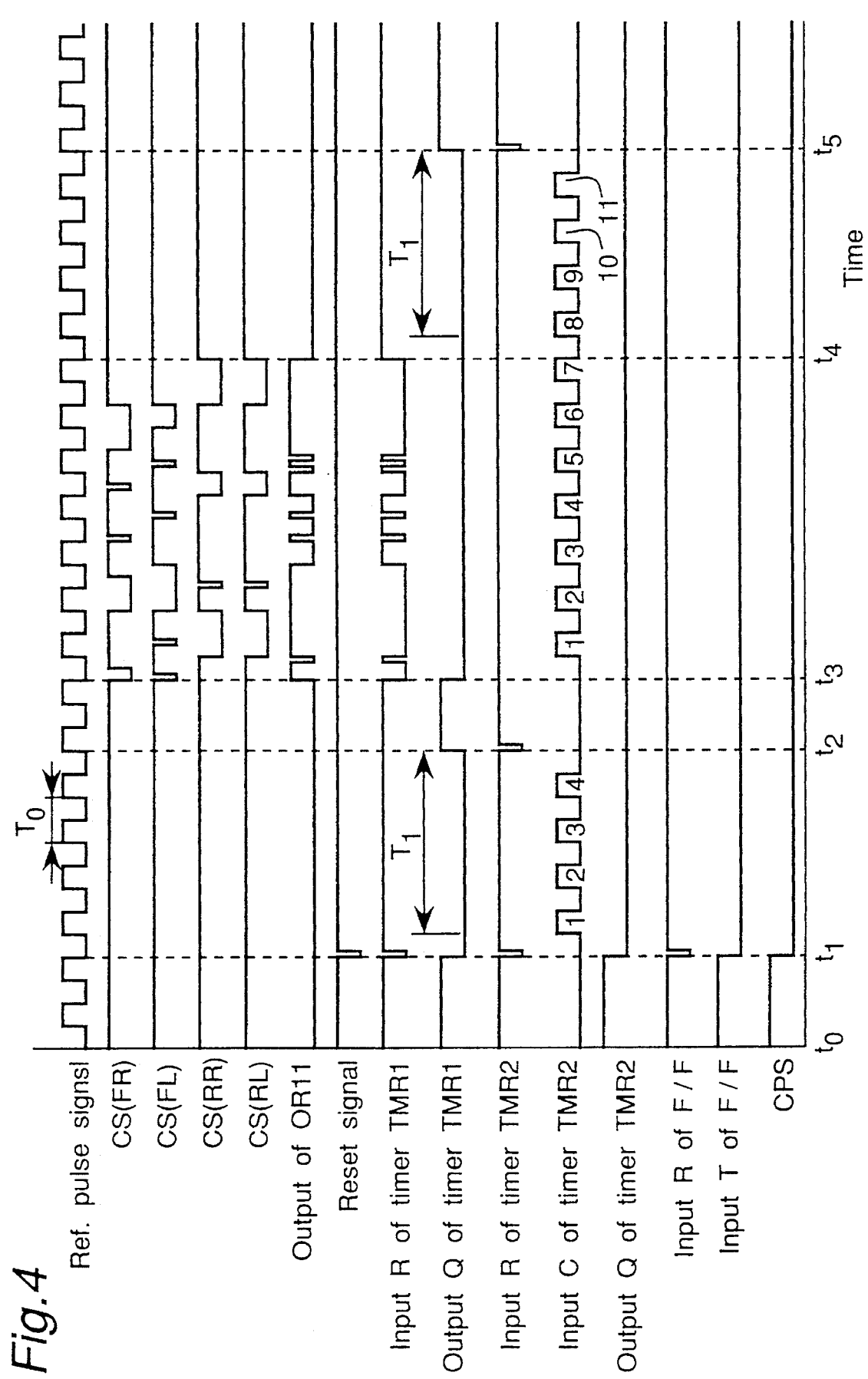

Then, operation of the antilock brake control device K is described with reference to FIGS. 4 to 6. FIG. 4 shows a case in which the main microprocessor M-μP is functioning properly, while FIG. 5 shows a case in which the main microprocessor M-μP is malfunctioning. Furthermore, FIG. 6 shows operation of the antilock brake control device K at the time of initial check, namely, when detection of malfunction of the monitor MNTR is performed upon turning on a power source of a motor vehicle at the time of start of the motor vehicle.

In FIG. 4, during a period from a time point $t_0$ to a time point $t_3$, all the control signals CS(FR) to CS(RL) outputted by the antilock decision portion LCK are of high level. When a pulse signal of low level is inputted, as a reset signal, to the monitor MNTR at a time point $t_1$, the pulse signal of low level is accordingly inputted to the reset inputs R of the first timer TMR1, the second timer TMR2 and the flip-flop circuit F, so that the first timer TMR1, the second timer TMR2 and the flip-flop circuit F are reset. In response to input of the reset signal, the first timer TMR1 counts the reference pulse signal inputted from the oscillation circuit 17 and outputs a signal of low level from the output Q for the period $T_1$. On the other hand, the outputs Q of the second timer TMR2 and the flip-flop circuit F are set to low level by this reset signal. Meanwhile, since the output of the first timer TMR1 is set to low level as described above, the reference pulse signal is inputted to the clock input C of the second timer TMR2.

At a time point $t_2$ upon lapse of the first predetermined period $T_1$ from the time point $t_1$, the output of the first timer TMR1 changes from low level to high level. Thus, the reset signal is inputted to the reset input R of the second timer TMR2 such that the number of the reference pulse signals counted by the second timer TMR2 is cleared.

During a period from the time point $t_3$ to a time point $t_4$, a state lasts in which the output of the OR circuit 11 assumes high level intermittently, namely, one of the control signals CS(FR) to CS(RL) assumes low level at least once during the first predetermined period $T_1$. Therefore, during the period from the time point $t_3$ to the time point $t_4$, the output of the first timer TMR1 is set to low level at all times and thus, the reference pulse signal is continuously inputted to the clock input C of the second timer TMR2 from the oscillation circuit 17. When all the control signals CS(FR) to CS(RL) are changed to high level at the time point $t_4$, the output of the OR circuit 11 is set to low level. However, during the first predetermined period $T_1$ from the time point $t_4$ to a time point $t_5$, the output of the first timer TMR1 is of low level and thus, the reference pulse signal is continuously inputted to the clock input C of the second timer TMR2. The second timer TMR2 counts the reference pulse signal. In the example of FIG. 4, since the number of pulses of the reference pulse signal is 11 at the time point $t_5$, the monitor MNTR continues to output the control prohibition signal CPS of low level by judging that the main microprocessor M-μP functions properly.

Then, operation of the antilock brake control device K in the case of FIG. 5 in which malfunction of the main microprocessor M-μP has been detected. In FIG. 5, operation from the time point $t_0$ to the time point $t_3$ is identical with that of FIG. 4. From the time point $t_3$ on, a state lasts in which one of the control signals CS(FR) to CS(RL) assumes low level at least once during the first predetermined period $T_1$. Therefore, from the time point $t_3$ on, since the output of the first timer TMR1 is set to low level, the reference pulse signal is continuously inputted to the clock input C of the second timer TMR2 from the oscillation circuit 17.

If it is detected at the time point $t_4$ that the 73rd reference pulse signal has been inputted to the second timer TMR2, namely, it is detected that a state in which one of the control signals CS(FR) to CS(RL) for commanding pressure reduction is outputted at least once during the first predetermined period $T_1$ has lasted continuously for not less than the second predetermined period $T_2$, the signal outputted from the output Q of the second timer TMR2 changes from low level to high level. As described above, the output of the second timer TMR2 is inputted to the trigger input T of the flip-flop circuit F. Therefore, if the output of the second timer TMR2 changes from low level to high level, the control prohibition signal CPS outputted from the output Q of the flip-flop circuit F changes from low level to high level and thus, operation of the drive circuit DRV is prohibited.

Thus, if a state in which one of the control signals CS(FR) to CS(RL) for commanding pressure reduction is outputted at least once during the first predetermined period $T_1$ has lasted continuously for not less than the second predetermined period $T_2$, the monitor MNTR prohibits operation of the drive circuit DRY by judging that the main microprocessor M-μP does not function properly. Accordingly, malfunction of the main microprocessor M-μP can be detected positively.

Meanwhile, in this embodiment, since the main microprocessor M-μP is monitored by the monitor MNTR formed by the electronic circuit, malfunction of the main microprocessor M-μP can be detected positively even in the case of systematic error.

Then, operation of the antilock brake control device K at the time of initial check is described with reference to FIG. 6. At the time of initial check, the testing signal output portion TSO outputs the control signals CS(FR) to CS(RL). During a period from the time point $t_0$ to the time point $t_2$, all the control signals CS(FR) to CS(RL) outputted by the antilock decision portion LCK are of high level. When a reset pulse is outputted to the monitor MNTR at the time point $t_1$, the first timer TMR1 outputs a signal of low level during the first predetermined period $T_1$, while the outputs Q of the second timer TMR2 and the flip-flop circuit F are also set to low level.

At the time point $t_2$ upon lapse of the period $T_1$ from the time point $t_1$, the output of the first timer TMR1 changes from low level to high level and thus, count of the reference pulse signal by the second timer TMR2 is cleared.

From the time point $t_3$ on, the testing signal output portion TSO momentarily changes the control signals CS(FR), CS(FL), CS(RR) and CS(RL) from high level to low level sequentially at an interval of a period $T_3$ shorter than the first predetermined period $T_1$. Therefore, from the time point $t_3$ on, the second timer TMR2 continues to count the reference pulse signal without being reset. Meanwhile, a period ΔT during which the control signals CS(FR) to CS(RL) are changed to low level momentarily is set to such a small value that the actuators $ACT_0$ to $ACT_3$ are not mechanically operated in the period ΔT even if the drive signals DS(FR) to DS(RL) have been outputted to the actuators $ACT_0$ to $ACT_3$ in response to input of these control signals CS(FR) to CS(RL) to the drive circuit DRV.

If the number of the reference pulse signals measured by the second timer TMR2 exceeds 72 at the time point $t_4$, namely, if a state in which one of the control signals CS(FR)

to CS(RL) of low level is outputted at least once during the first predetermined period $T_1$ from initial output of one of the control signals CS(FR) to CS(RL) of low level has lasted continuously for not less than the second predetermined period $T_2$, the output of the second timer TMR2 is set to high level and thus, the flip-flop circuit F outputs the control prohibition signal CPS of high level. At the time point $t_5$, the reset signal is outputted and thus, initial check of the monitor MNTR is completed.

If the control prohibition signal CPS' remains at low level as shown by the one-dot chain line in FIG. 6 in spite of the fact that the second timer TMR2 has detected lapse of the second predetermined period $T_2$, the testing portion TST outputs the operational prohibition signal PS of high level by judging that the monitor MNTR does not function properly. As a result, operation of the main microprocessor M-μP and the drive circuit DRV is prohibited.

Similarly, if the second timer TMR2 outputs the control prohibition signal CPS of high level prior to lapse of the second predetermined period $T_2$ as shown by the two-dot chain line in FIG. 6, the testing portion TST outputs the operational prohibition signal PS of high level by judging that the monitor MNTR does not function properly. As a result, operation of the main microprocessor M-μP and the drive circuit DRV is prohibited.

At the time of initial check in this embodiment, the control signals CS(FR) to CS(RL) are changed for such a short period in which the actuators $ACT_0$ to $ACT_3$ are not operated mechanically as described above. Therefore, even in case the motor vehicle is parked on a slope at the time of initial check, the motor vehicle is not caused to run downwardly and thus, initial check can be performed positively and safely.

The present invention is not restricted to the above described embodiment but can be modified variously. For example, the monitor MNTR is formed by the electronic circuit in the above described embodiment but may also be formed by a microprocessor of a type different from that of the main microprocessor M-μP.

Meanwhile, the actuators have two modes of pressure increase and pressure reduction in the above described embodiment but may also have three modes of pressure increase, pressure reduction and pressure holding. In this case, when a state in which one of the control signals CS(FR) to CS(RL) for commanding pressure reduction or pressure holding is outputted at least once during the first predetermined period $T_1$ has lasted continuously for not less than the second predetermined period $T_2$, operation of the drive circuit DRV may be prohibited by judging that the main microprocessor M-μP does not function properly.

Furthermore, the monitor MNTR is adapted to monitor the control signals CS(FR) to CS(RL) in the embodiment referred to above but may also be adapted to monitor the drive signals DS(FR) to DS(RL) in place of the control signals CS(FR) to CS(RL).

Moreover, in the above mentioned embodiment, operation of the drive circuit DRV is prohibited if the monitor MNTR has detected malfunction of the main microprocessor M-μP. However, alternatively, in case malfunction of the main microprocessor M-μP has been detected, the main microprocessor M-μP itself may also be disabled.

In addition, the antilock brake control device of the above described embodiment is of four-channel type including the four brake fluid pressure circuits C-FR, C-FL, C-RR and C-RR but may also be of three-channel type or two-channel type.

Meanwhile, in case malfunction of the monitor MNTR has been detected at the time of initial check, operation of either one of the main microprocessor M-μP and the drive circuit DRV may also be prohibited.

In the antilock brake control device of claim 1, when a state in which the main microprocessor outputs to the actuator at least once during the first predetermined period the control signal for commanding pressure reduction or pressure holding has lasted continuously for not less than the second predetermined period, the control prohibition signal for prohibiting operation of the drive circuit is outputted by judging that the main microprocessor does not function properly. Therefore, antilock can be prohibited by detecting malfunction of the main microprocessor positively.

In the antilock brake control device of claim 2, when a state in which the main microprocessor outputs to the actuator at least once during the first predetermined period the control signal for commanding pressure reduction or pressure holding has lasted continuously for not less than the second predetermined period, the control prohibition signal for prohibiting operation of the main microprocessor is outputted by judging that the main microprocessor does not function properly. Thus, antilock control can be prohibited by detecting malfunction of the main microprocessor positively.

In the antilock brake control device of claims 3 and 4, in case the control prohibition signal is not outputted when a state in which the testing signal output portion outputs the control signal of pressure reduction or pressure holding at least once during the first predetermined period has lasted continuously for not less than the second predetermined period, operation of at least one of the main microprocessor and the drive circuit is prohibited by judging that the monitor does not function properly. Accordingly, at the time of initial check, antilock control can be prohibited by positively detecting malfunction of the monitor.

In the antilock brake control device of claims 5 and 6, in case the control prohibition signal is outputted when a state in which the testing signal output portion outputs the control signal of pressure reduction or pressure holding at least once during the first predetermined period has lasted continuously for less than the second predetermined period, operation of at least one of the main microprocessor and the drive circuit is prohibited by judging that the monitor does not function properly. Therefore, at the time of initial check, antilock control can be prohibited by positively detecting malfunction of the monitor.

In the antilock brake control device of claims 7 to 10, the control signal of pressure reduction or pressure holding outputted by the testing signal output portion is a pulse signal having a short period in which the actuator is not operated mechanically. Therefore, brake fluid pressure is not reduced at the time of initial check and thus, initial check of the monitor can be performed positively and safely.

In the antilock brake control device of claims 11 to 16, the monitor is formed by a microprocessor of a type different from that of the main microprocessor. Accordingly, it is possible to positively detect malfunction of the main microprocessor also in the case of systematic error.

In the antilock brake control device of claims 17 to 22, the monitor is formed by an electronic circuit. Therefore, malfunction of the main microprocessor can be detected positively also in the case of systematic error. Meanwhile, since the electronic circuit is usually more inexpensive than the microprocessor, production cost of the antilock brake control device as a whole can be reduced by forming the monitor by the electronic circuit.

What is claimed is:

1. An antilock brake control device comprising:

a main microprocessor which forms a judgment on antilock control on the basis of wheel speed signals inputted from wheel speed sensors so as to output control signals to an actuator of a brake fluid pressure circuits in accordance with the judgment;

a drive circuit for outputting drive signals to the actuator in response to the control signals; and a monitor for monitoring the control signals of the main microprocessor;

wherein when a state in which the main microprocessor outputs to the actuator at least once during a first predetermined period the control signals for commanding pressure reduction or pressure holding has lasted continuously for not less than a second predetermined period, the monitor outputs, by judging that the main microprocessor does not function properly, a control prohibition signal for prohibiting operation of the drive circuit.

2. An antilock brake control device as claimed in claim 1, wherein the main microprocessor includes a testing signal output portion for outputting the control signals irrespective of the judgment of the main microprocessor on antilock control and a testing portion for monitoring the control prohibition signal outputted by the monitor;

wherein in case the control prohibition signal is not outputted when a state in which the testing signal output portion outputs the control signals of pressure reduction or pressure holding at least once during the first predetermined period has lasted continuously for not less than the second predetermined period, the testing portion prohibits, by judging that the monitor does not function properly, operation of at least one of the main microprocessor and the drive circuit.

3. An antilock brake control device as claimed in claim 2, wherein the control signals of pressure reduction or pressure holding outputted by the testing signal output portion is a pulse signal having a short period in which the actuator is not operated mechanically.

4. An antilock brake control device as claimed in claim 2, wherein the monitor is formed by a microprocessor of a type different from that of the main microprocessor.

5. An antilock brake control device as claimed in claim 2, wherein the monitor is formed by an electronic circuit.

6. An antilock brake control device as claimed in claim 1, wherein the main microprocessor includes a testing signal output portion for outputting the control signals irrespective of the judgment of the main microprocessor on antilock control and a testing portion for monitoring the control prohibition signal outputted by the monitor;

wherein in case the control prohibition signal is outputted when a state in which the testing signal output portion outputs the control signals of pressure reduction or pressure holding at least once during the first predetermined period has lasted continuously for less than the second predetermined period, the testing portion prohibits, by judging that the monitor does not function properly, operation of at least one of the main microprocessor and the drive circuit.

7. An antilock brake control device as claimed in claim 6, wherein the control signals of pressure reduction or pressure holding outputted by the testing signal output portion is a pulse signal having a short period in which the actuator is not operated mechanically.

8. An antilock brake control device as claimed in claim 6, wherein the monitor is formed by a microprocessor of a type different from that of the main microprocessor.

9. An antilock brake control device as claimed in claim 6, wherein the monitor is formed by an electronic circuit.

10. An antilock brake control device as claimed in claim 1, wherein the monitor is formed by a microprocessor of a type different from that of the main microprocessor.

11. An antilock brake control device as claimed in claim 1, wherein the monitor is formed by an electronic circuit.

12. An antilock brake control device comprising:

a main microprocessor which forms a judgment on antilock control on the basis of wheel speed signals inputted from wheel speed sensors so as to output control signals to an actuator of a brake fluid pressure circuit in accordance with the judgment;

a drive circuit for outputting drive signals to the actuator in response to the control signals; and a monitor for monitoring the control signals of the main microprocessor;

wherein when a state in which the main microprocessor outputs to the actuator at least once during a first predetermined period the control signals for commanding pressure reduction or pressure holding has lasted continuously for not less than a second predetermined period, the monitor outputs, by judging that the main microprocessor does not function properly, a control prohibition signal for prohibiting operation of the main microprocessor.

13. An antilock brake control device as claimed in claim 12, wherein the main microprocessor includes a testing signal output portion for outputting the control signals irrespective of the judgment of the main microprocessor on antilock control and a testing portion for monitoring the control prohibition signal outputted by the monitor;

wherein in case the control prohibition signal is not outputted when a state in which the testing signal output portion outputs the control signals of pressure reduction or pressure holding at least once during the first predetermined period has lasted continuously for not less than the second predetermined period, the testing portion prohibits, by judging that the monitor does not function properly, operation of at least one of the main microprocessor and the drive circuit.

14. An antilock brake control device as claimed in claim 13, wherein the control signals of pressure reduction or pressure holding outputted by the testing signal output portion is a pulse signal having a short period in which the actuator is not operated mechanically.

15. An antilock brake control device as claimed in claim 13, wherein the monitor is formed by a microprocessor of a type different from that of the main microprocessor.

16. An antilock brake control device as claimed in claim 13, wherein the monitor is formed by an electronic circuit.

17. An antilock brake control device as claimed in claim 12, wherein the main microprocessor includes a testing signal output portion for outputting the control signals irrespective of the judgment of the main microprocessor on antilock control and a testing portion for monitoring the control prohibition signal outputted by the monitor;

wherein in case the control prohibition signal is outputted when a state in which the testing signal output portion outputs the control signals of pressure reduction or pressure holding at least once during the first predetermined period has lasted continuously for less than the second predetermined period, the testing portion prohibits, by judging that the monitor does not function properly, operation of at least one of the main microprocessor and the drive circuit.

18. An antilock brake control device as claimed in claim 17, wherein the control signals of pressure reduction or pressure holding outputted by the testing signal output portion is a pulse signal having a short period in which the actuator is not operated mechanically.

19. An antilock brake control device as claimed in claim 17, wherein the monitor is formed by a microprocessor of a type different from that of the main microprocessor.

20. An antilock brake control device as claimed in claim 17, wherein the monitor is formed by an electronic circuit.

21. An antilock brake control device as claimed in claim 12, wherein the monitor is formed by a microprocessor of a type different from that of the main microprocessor.

22. An antilock brake control device as claimed in claim 12, wherein the monitor is formed by an electronic circuit.

* * * * *